United States Patent [19]

Lavin et al.

[11] Patent Number: 5,755,479
[45] Date of Patent: May 26, 1998

[54] UMBILICUS SYSTEM FOR DELIVERING MEDICAL SERVICES

[75] Inventors: Gregory C. Lavin; Craig A. Young, both of Geneva, N.Y.

[73] Assignee: Theradynamics Corporation, Geneva, N.Y.

[21] Appl. No.: 838,465

[22] Filed: Apr. 7, 1997

Related U.S. Application Data

[63] Continuation of Ser. No. 397,402, Mar. 2, 1995, abandoned.

[51] Int. Cl.$^6$ ..................................................... B60P 3/00
[52] U.S. Cl. ........................... 296/24.1; 296/19; 296/20; 296/26; 5/119; 5/503.1; 5/600; 52/36.1
[58] Field of Search ..................... 296/397, 402, 296/19, 20, 24.1, 26; 5/119, 503.1, 600, 625, 658; 128/906; 174/49, 70 R; 52/36.1

[56] References Cited

U.S. PATENT DOCUMENTS

| | | | |
|---|---|---|---|
| 2,370,402 | 2/1945 | Gutman | 296/19 |
| 2,464,923 | 3/1949 | Davis . | |
| 3,462,892 | 8/1969 | Meyer | 174/49 X |
| 3,509,810 | 5/1970 | Riester . | |
| 3,514,794 | 6/1970 | Pofferi | 5/658 X |
| 3,567,273 | 3/1971 | Haas . | |
| 3,660,591 | 5/1972 | Schultz et al. | 5/658 X |
| 3,699,235 | 10/1972 | Wasson et al. | 174/48 |
| 3,711,664 | 1/1973 | Benoit et al. . | |
| 3,921,345 | 11/1975 | Damico | 174/70 R X |
| 4,181,347 | 1/1980 | Clark | 296/19 |
| 4,352,991 | 10/1982 | Kaufman | 296/20 |
| 4,550,946 | 11/1985 | Hanemaayer | 296/156 |
| 4,557,453 | 12/1985 | McCloskey | 248/287 |
| 4,570,733 | 2/1986 | Star | 180/41 |
| 4,581,986 | 4/1986 | Conklin et al. | 49/41 |
| 4,584,989 | 4/1986 | Stith | 600/18 |
| 4,646,211 | 2/1987 | Gallant et al. | 174/49 X |
| 4,680,790 | 7/1987 | Packard | 5/658 X |

(List continued on next page.)

FOREIGN PATENT DOCUMENTS

| | | | |
|---|---|---|---|
| 0219469 | 4/1987 | European Pat. Off. | 296/19 |
| 773352 | 11/1934 | France | 296/219 |
| 1366174 | 6/1964 | France . | |
| 2417294 | 9/1979 | France | 5/600 |
| 1178550 | 9/1964 | Germany | 296/19 |
| 2421693 | 11/1975 | Germany . | |
| 3422022 | 12/1985 | Germany | 5/658 |
| 602756 | 3/1960 | Italy | 296/24.1 |
| 1049235 | 11/1966 | United Kingdom | 296/24.1 |
| 2078626 | 1/1982 | United Kingdom | 296/26 |

OTHER PUBLICATIONS

Hill–Rom Brochure "First Impression Series" copyright 1991 Copy in Class 52 Subclass 36.1.
Diamond III and Diss III Gas Service Outlets for Hospital Piping Systems, Ohio/Diamond III, Diss III Service Outlets Catalog, Ohio Medical Products, 8 pages.
Miscellaneous Information Sheets From Fairfield Medical Products Corporation, 8 pages.
The Fairfield Horizontal Rail/Headwall System Brochure, Fairfield Medical Products Corporation 1989, 6 pages.
Architectural Specifications, Fairfield Medical Rail Systems Brochure, Fairfield Medical Products Corporation, Nov. 1991, 5 pages.
Medical Gas Rail Specifications, Fairfield Medical Products Corporation Brochure, Mar. 1992, 4 pages.
Life–Support Cocoon Advertisement, Popular Science, Feb. 1995, 1 page.

*Primary Examiner*—Dennis H. Pedder
*Attorney, Agent, or Firm*—Eugene Stephens & Associates

[57] ABSTRACT

An umbilicus system includes a mobile medical unit and interior and exterior treatment platforms connected to the mobile medical unit with respective umbilici that include bundles of lines for conveying medical and electrical utilities from the mobile medical unit to the treatment platforms. The umbilici are supported within the treatment platforms on trays that have openings for extending free ends of the umbilici from either end of the treatment platforms. The utilities conveyed by the umbilici are made available from medical action boards located at a front end of the treatment platforms.

28 Claims, 8 Drawing Sheets

U.S. PATENT DOCUMENTS

| | | | |
|---|---|---|---|
| 4,691,397 | 9/1987 | Netzer | 5/507 |
| 4,768,241 | 9/1988 | Beney | 5/600 |
| 4,842,224 | 6/1989 | Cohen | 244/159 |
| 4,858,256 | 8/1989 | Shankman | 296/19 X |
| 4,915,435 | 4/1990 | Levine | 296/24.1 |
| 4,957,121 | 9/1990 | Icenogle et al. | 296/19 X |
| 5,072,906 | 12/1991 | Foster | 5/658 X |
| 5,149,036 | 9/1992 | Sheehan | 5/658 |
| 5,186,337 | 2/1993 | Foster et al. | 5/658 X |
| 5,236,390 | 8/1993 | Young | 296/19 X |
| 5,327,600 | 7/1994 | Hoggendoorn | 5/625 |

UMBILICUS SYSTEM FOR DELIVERING MEDICAL SERVICES

RELATED APPLICATIONS

This application is a Continuation of parent Application Ser. No. 08/397,402, filed 2 Mar. 1995, entitled UMBILICUS SYSTEM FOR DELIVERING MEDICAL SERVICES, and abandoned upon the filing of this Continuation application.

TECHNICAL FIELD

The invention relates to deployable medical services including the delivery of medical supplies to treatment platforms and the integration of treatment platforms into multi-patient care facilities.

BACKGROUND

Medical outcomes often depend upon the timeliness of initiating care. This is particularly true of severe injuries, where such timeliness is referred to as a patient's so-called "golden hour" within which medical intervention is most effective at saving lives.

Natural disasters and combat, which can produce great needs for such medical interventions, often take place in remote locations far away from hospitals or overwhelm the capacities of local care facilities. Rapid transport of patients can expand the range of available facilities, but the deployment of mobile medical facilities to the areas of need is sometimes the only or most effective way of dispensing timely medical care.

Mobile medical facilities take many forms from trailers to tents. U.S. Pat. No. 5,236,390 to coinventor Young discloses a fixed-walled mobile medical unit that is deployable by either air or ground transports. The mobile medical unit can be deployed alone or in combination with similar medical units to provide a variety of medical care specialties including surgery, emergency care, intensive care, pre- and post-operation care, as well as multi-bed wards.

Although such flexibility of purpose is important for dealing with the wide variety of medical needs on battlefields or sites of disasters, flexibility of capacity is also important for dealing with sudden influxes of patients. For this reason, applicants have devised a new umbilicus system that greatly expands the capability of mobile medical units to provide continuous care to multiple patients.

SUMMARY OF INVENTION

The core of our new umbilicus system is the umbilicus itself which bundles together lines for conveying medical utilities between a supply of the utilities and a treatment platform. The umbilicus provides for quickly connecting the lines to the utility source, for protecting the lines from damage, and for promoting better patient access.

One version of our invention is a new umbilicus system for delivering medical services from both inside and outside a mobile medical unit. Interior space of the mobile medical unit is divided into a treatment compartment and a service compartment. The service compartment contains central medical utilities, and the treatment compartment includes an interior treatment platform for administering medical services to patients. The treatment compartment also includes a series of interior ports connected to the central medical utilities. An interior umbilicus connects the interior ports to the interior treatment platform for delivering the medical utilities to the interior treatment platform.

In addition, one or more exterior treatment platforms are located outside of the mobile medical unit, which also includes a series of exterior ports connected to the medical utilities. An exterior umbilicus connects the exterior ports to each of the exterior treatment platforms for delivering the medical utilities to the platforms. This greatly expands the capacity of the mobile medical unit to treat additional patients simultaneously.

Another version of our invention is a new medical treatment platform. The new treatment platform includes a frame supporting a litter and a series of outlets that dispense both medical and electrical utilities. An umbilicus including a sheath surrounding a bundle of lines respectively connected to the outlets delivers the medical and electrical utilities to the outlets from a remote source.

Preferably, a tray located beneath the litter and extending between opposite ends of the treatment platform supports the umbilicus so it can be extended from either end of the treatment platform. A free end of the umbilicus is split into a first group of lines that deliver the medical utilities and a second group of lines that deliver the electrical utilities. Retractable access cables connect to a neck portion of the umbilicus before the split to enable the free end of the umbilicus to be pulled from either end of the treatment platform. A safety cable among the lines bundled by the sheath can be connected to a nearby support to protect the lines from overextension.

The outlets are preferably mounted on a medical action board, which is conveniently located at a front end of the treatment platform. The umbilicus supplies the medical action board with such services as medical gases, air pressure, vacuum, electric power, medical monitoring, and voice communications.

The treatment platform is preferably a gurney having onboard medical utilities that are connected to the outlets for dispensing medical utilities while the gurney is being moved. Valves alternately connect the outlets to the umbilicus or to the onboard medical utilities, thereby assuring continuous treatment of patients.

DRAWINGS

DETAILED DESCRIPTION

Figure 1:
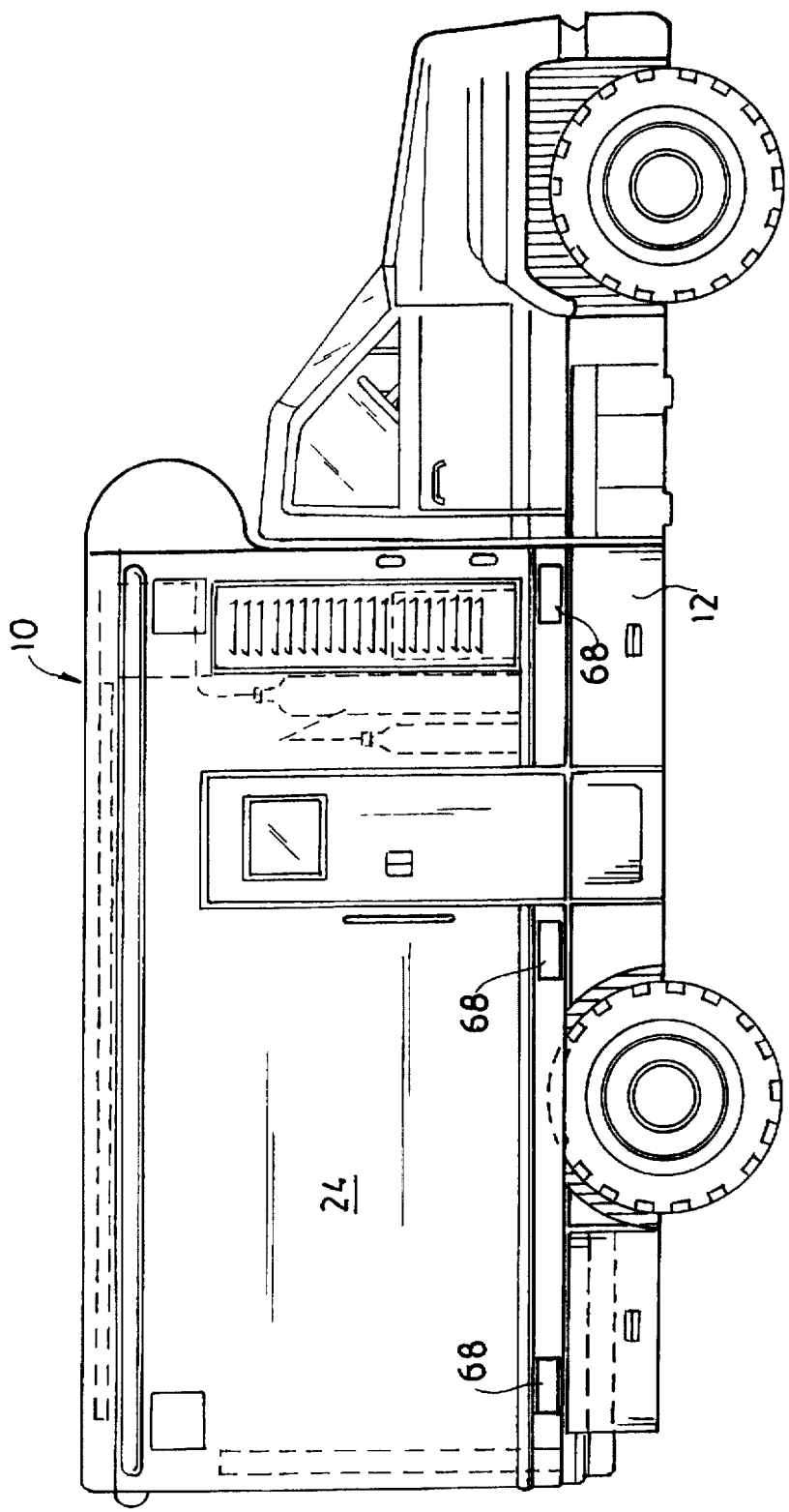
FIG. 1 is a side view of our mobile medical unit mounted on a truck chassis.
Figure 2:
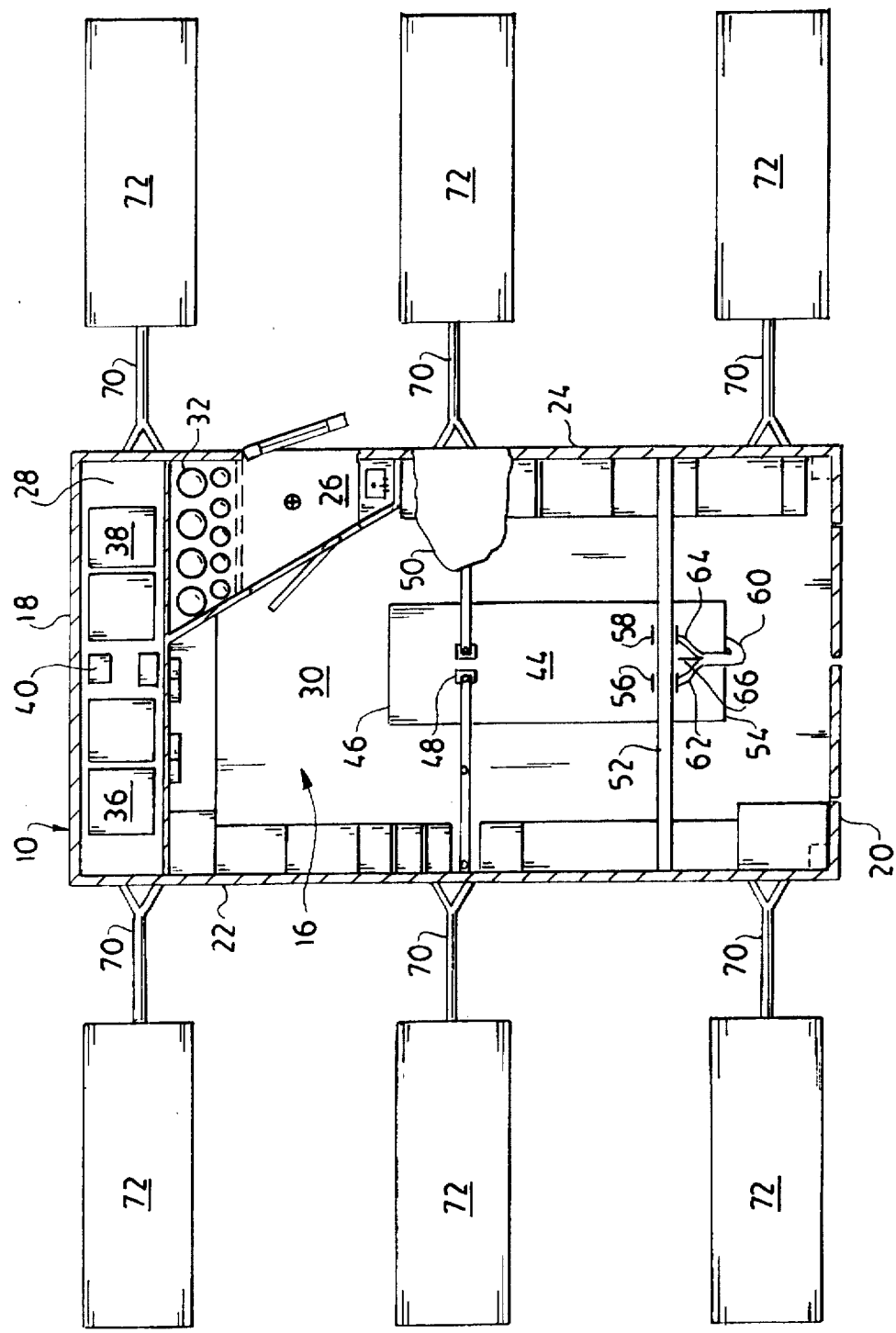
FIG. 2 is a largely schematic cross-sectional plan view through the medical unit showing interior and exterior treatment platforms connected to the medical unit with umbilici.
Figure 3:
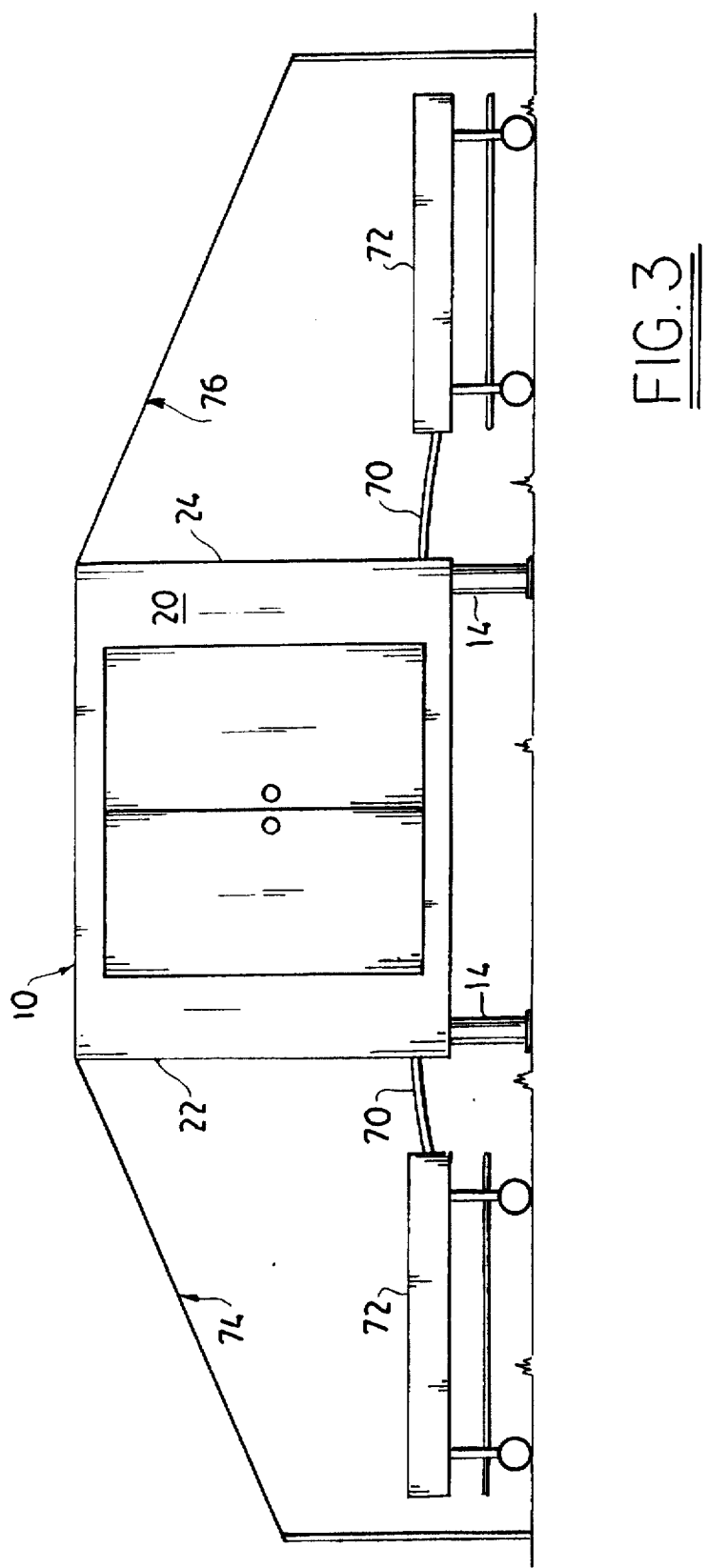
FIG. 3 is a rear view of our mobile medical unit with soft shelters extended for covering the exterior treatment platforms.

A mobile medical unit 10 for use in our invention is mounted on a truck chassis 12 as shown in FIG. 1. The mobile medical unit is similar to a mobile medical unit disclosed in coassigned U.S. Pat. No. 5,236,390, which is hereby incorporated by reference. The size, shape, and weight of the mobile medical unit 10 are limited by the mode of deployment which can include air cargo, helicopter, as well as alternative types of ground transport. Following deployment as shown in FIGS. 2 and 3, the mobile medical unit can be supported on jacks 14.

The mobile medical unit 10 has interior space 16 enclosed by front and rear exterior walls 18 and 20 and two side exterior walls 22 and 24. The interior space 16 is divided into an entryway compartment 26, a service compartment 28, and a treatment compartment 30. The entryway compartment 26 provides an airlock to help maintain an aseptic attitude within the treatment compartment 30. A storage compartment 32 containing various medical supplies including medical gases 34 is accessible through the entryway compartment 26. However, for purposes of this invention, the storage compartment 32 can be considered as a part of the service compartment 28, which includes such features as generators 36, air handling equipment 38, and telecommunications equipment 40.

An interior treatment platform 44, such as a surgical gurney, is centered within the treatment compartment 30 for administering medical services to patients. Near a front end 46 of the treatment platform 44, an overhead examination light 48 is mounted from a ceiling 50. A rail system 52 having a first set of ports 56 for delivering medical utilities and a second set of ports 58 for delivering electrical utilities extends across the ceiling 50 near a rear end 54 of the treatment platform 44 for making the medical and electrical utilities conveniently available within the treatment compartment 30. An interior umbilicus 60 extending from the rear end 54 of the treatment platform splits into a first group of lines 62 connected to the first set of ports 56 and a second group of lines 64 connected to the second set of ports 58. A safety cable 66 within the umbilicus 60 connects the treatment platform 44 to an eyelet (not shown) in the ceiling 50 to protect the first and second groups of lines 62 and 64 from being inadvertently overextended.

The interior umbilicus 60 replaces a series of individual connections to horizontal rail systems or wall outlets, which restrict lateral access to the treatment platform. The medical utilities delivered by the umbilicus 60 preferably include oxygen, anesthetic or analgesic gas, vacuum, air, and water. The electrical utilities include 115 volt alternating current (VAC) and telemedical and voice communications. The first and second sets of ports 56 and 58 are separated by a distance of one foot (30.5 centimeters) to protect the medical gases from exposure to electrical spark.

Capacity for administering medical treatment is greatly expanded by providing sets 68 of exterior ports in the two side exterior walls 22 and 24. Exterior umbilici 70 connect the sets 68 of exterior ports to respective exterior treatment platforms 72 for delivering both medical and electrical utilities to the exterior treatment platforms 72. Soft shelters 74 and 76 in the form of tents or other collapsible shelters extend from said exterior walls 22 and 24 of the mobile medical unit 10 for covering the treatment platforms 72.

Figure 4:
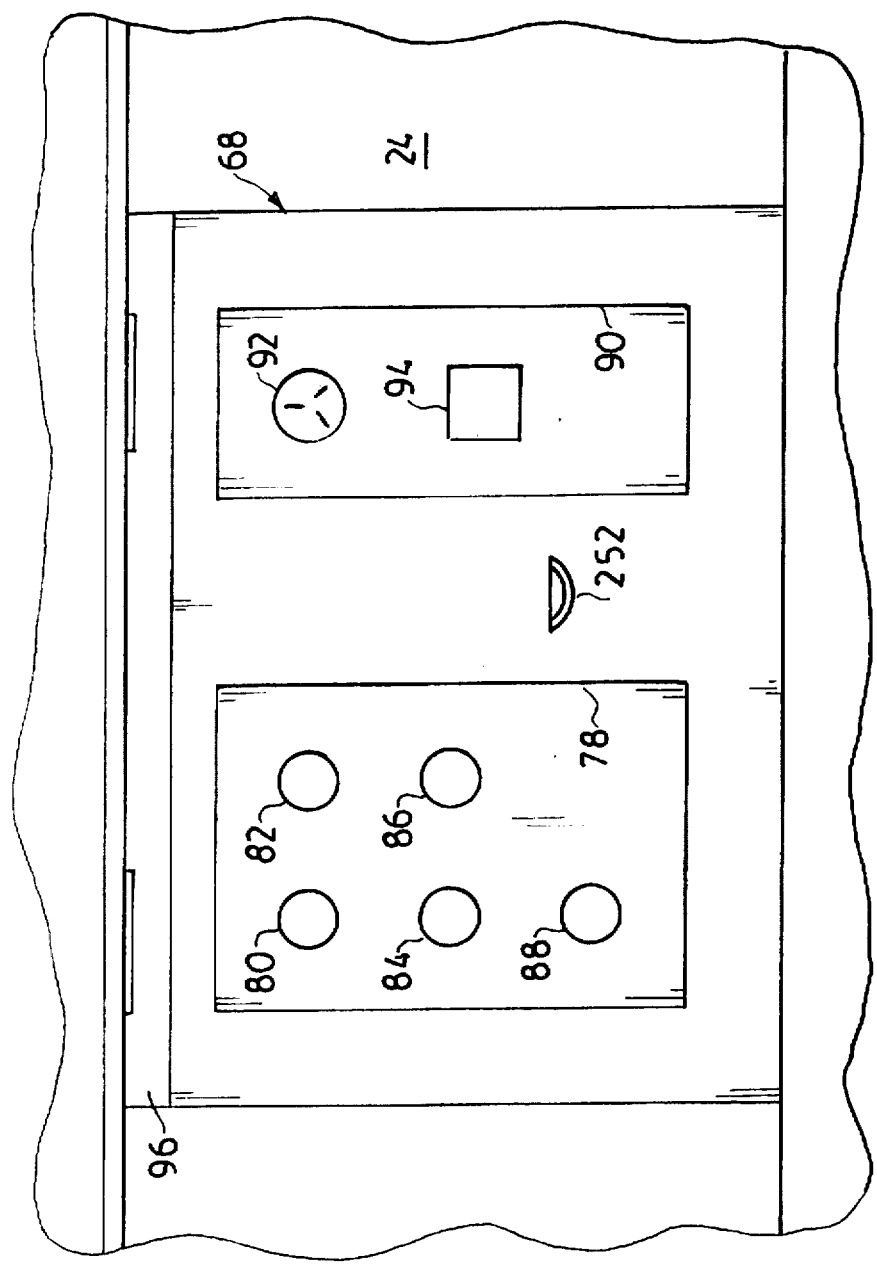
FIG. 4 is a relatively enlarged cut-away view of one side of the mobile medical unit showing two sets of ports for delivering medical and electrical utilities.

FIG. 4 shows one of the sets 68 of exterior ports recessed within the exterior side wall 24. One recess 78 within the exterior wall 24 contains oxygen port 80, anesthetic or analgesic port 82, air port 84, vacuum port 86, and water port 88 for making medical utilities available for use outside of the mobile medical unit 10. Another recess 90 within the exterior wall 24 contains an electrical power port 92 and a communications port 94 for making electrical utilities similarly available. Although separated to prevent exposure between the two types of utilities, both recesses 78 and 90 can be closed by a single cover 96 that is hinged above the recesses 78 and 90 for further sheltering the ports when open.

The remaining drawing FIGS. 5–8 show a preferred arrangement of the interior and exterior treatment platforms 44 and 72 as a gurney 100. The gurney 100 includes the usual features of a frame 102 supporting a litter 104. Two collapsible side rails 106 and 108 confine patients during transport. A shelf 110 along with other supporting structures of the frame 102 can accommodate a variety of major medical equipment including a resuscitator 112, an EKG and defibrillator 114, and an intravenous pump 116 and stand 118.

A limited supply of medical gases can also be carried on board including oxygen 120, anesthetic/analgesic 122, air 124, vacuum 126, and water 128. A battery 130 is also provided as a temporary power source for the medical equipment. The various onboard utilities are connected to corresponding medical and electrical outlets 132 and 134 on a medical action board 136 located at a front end 138 of the gurney 100. The medical action board 136 is located close to where patients' heads are expected to be supported on the litter 104 for much improved convenience over comparable wall-mounted stations that can restrict access to patients.

A more permanent supply of utilities is delivered to the medical action board 136 by an umbilicus 140. The umbilicus 140 includes a bundle of lines 142 surrounded by a sheath 144. The lines include tubes 146, 148, 150, 152, and 154 for conveying respective medical utilities such as oxygen, anesthetic/analgesic, air, vacuum, and water and groups of wires 156 and 158 for conveying electrical utilities such as 115 VAC and monitoring and voice communications. A steel safety cable 160 is also included in the bundle of lines 142 to protect the remaining lines from excess tension. The sheath 144 is preferably a mesh such as a metal fishnet stocking that securely bounds and protects the bundle of lines 142 from wear or accidental damage.

Figure 7:
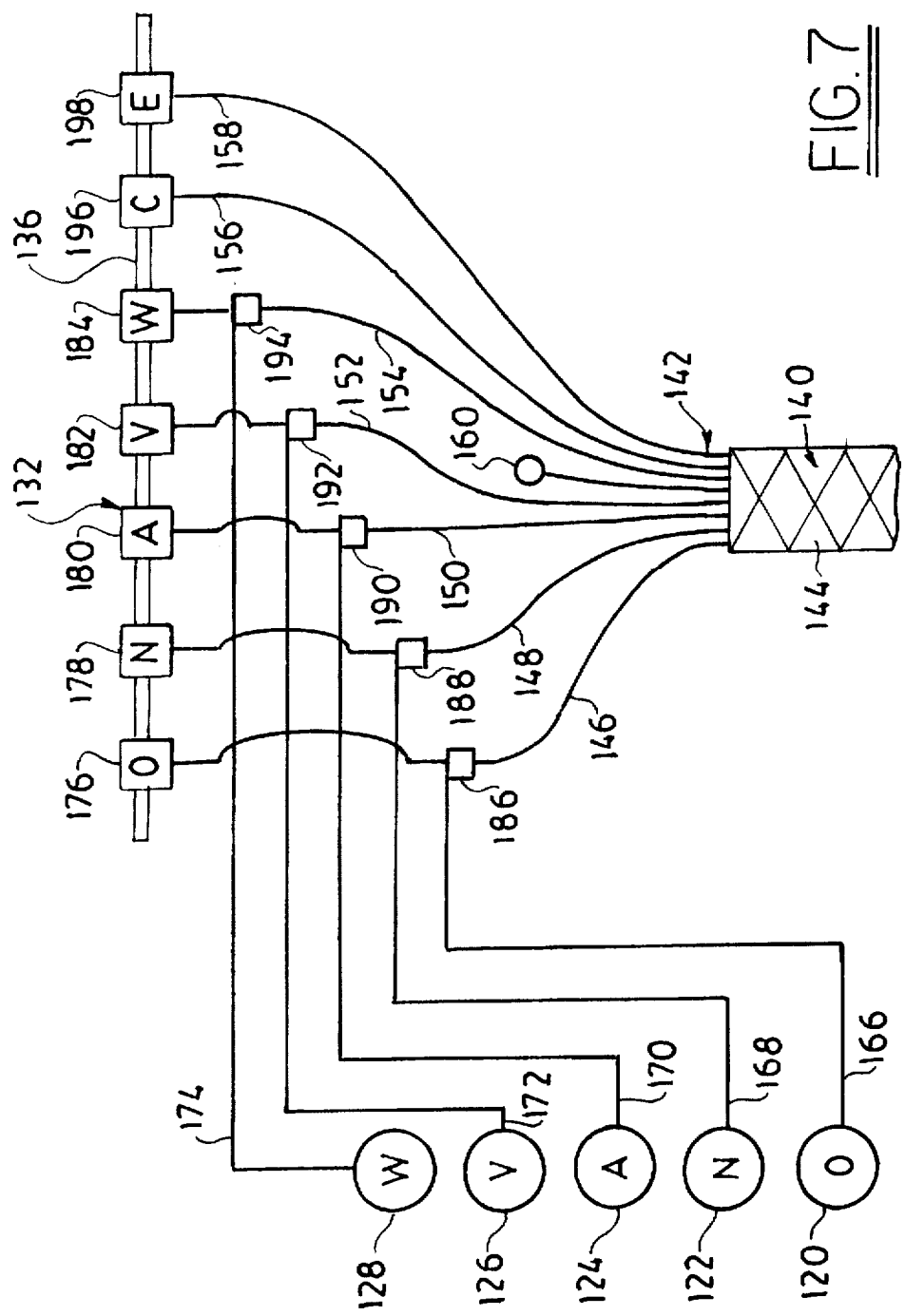
FIG. 7 is a schematic view of connections to a medical action board at the front end of the gurney.
Figure 8:
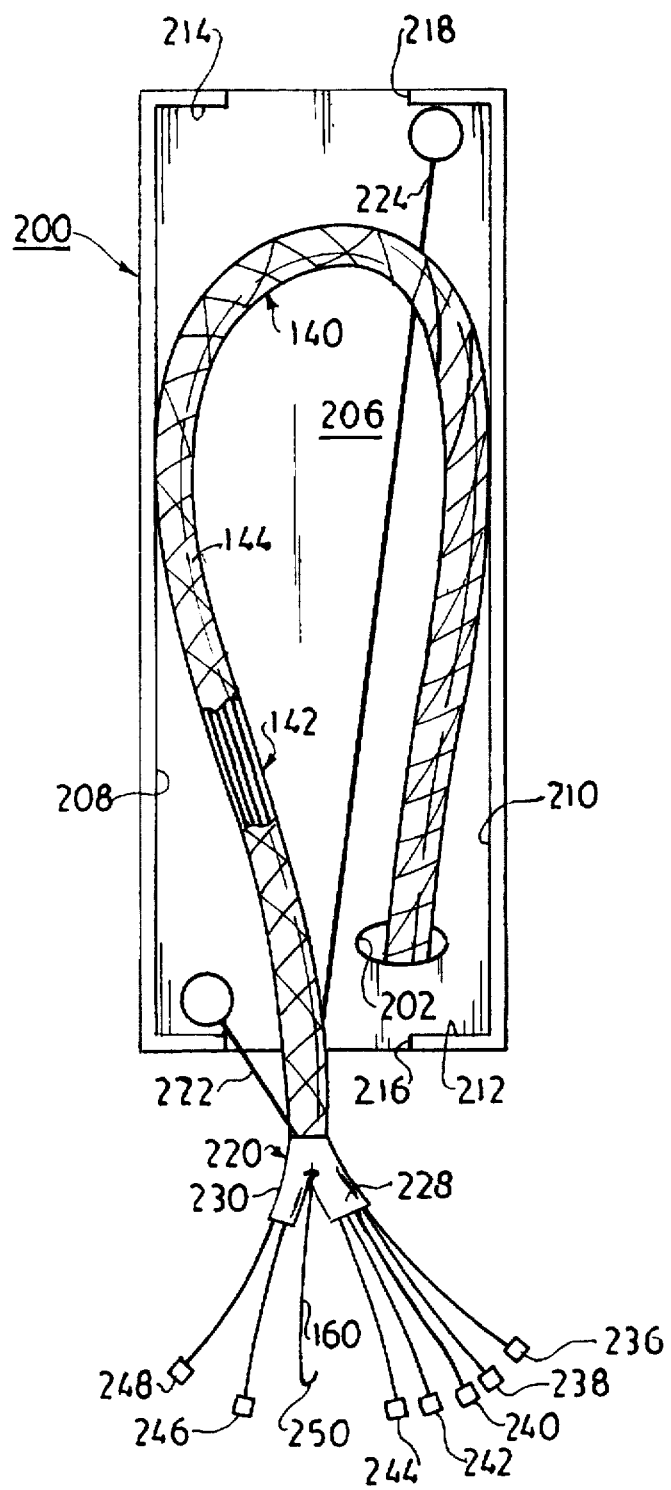
FIG. 8 is a schematic cut-away top view of the gurney showing a tray supporting an umbilicus for connecting the gurney to the two sets of ports.

FIG. 7 depicts connections from both the onboard medical utilities and the umbilicus 140 to the outlets 132 of medical action board 136. Both tubes 166, 168, 170, 172, and 174 from the onboard medical utilities 120, 122, 124, 126, and 128 and the tubes 146, 148, 150, 152, and 154 from the umbilicus 140 are connected to respective outlets 176, 178, 180, 182, and 184 for dispersing oxygen, anesthetic/analgesic, air, vacuum, and water. However, directional control valves 186, 188, 190, 192, and 194 are used to bypass the connections to the onboard utilities 120, 122, 124, 126, and 128 when the umbilicus 140 is used and to bypass the umbilicus 140 when the onboard utilities 120, 122, 124, 126, and 128 are used.

The groups of wires 156 and 158 from the umbilicus 140 are connected directly to respective outlets 196 and 198 for making electrical power and communications available through the umbilicus 140. One end of the safety cable 160 is anchored to the frame 102.

The umbilicus 140 emerges from its connections to the medical action board 136 through an opening 202 in a tray 200, which extends from a front end 138 to a rear end 204 of the gurney 100. The tray 200, which is supported on the frame 102, has a bottom 206, two side walls 208 and 210, and two end walls 212 and 214 for confining the umbilicus 140. However, respective openings 216 and 218 are formed in the two end walls 212 and 214 for withdrawing a free end 220 of the umbilicus 140 from either end 138 and 204 of the gurney 100.

Retractable access cables 222 and 224 mounted in the tray 200 adjacent to the respective openings 216 and 218 are attached to a neck portion 226 of the umbilicus 140 to assist withdrawing the umbilicus through either opening 216 and 218. Since the umbilicus emerges through the opening 202 into the tray 200 closer to the front end 138 of the gurney 100, the umbilicus can be extended to a greater length from the front end 138 of the gurney 100 than from the rear end 204 of the gurney 100. A minimum of approximately three feet (about one meter) of extension is needed from the rear end 204 to connect the umbilicus to overhead outlets. Even more extension is preferred from the front end 204 of the gurney 100 to provide increased flexibility for positioning the gurney 100 around the mobile medical unit 10.

The free end 220 of the umbilicus 140 is divided into a first group of lines 228 including the tubes 146, 148, 150, 152, and 154 for connecting to the exterior ports 80, 82, 84, 86, and 88 and a second group of lines 230 including the groups of wires 156 and 158 for connecting to the exterior ports 92 and 94. The first and second groups of lines 228 and 230 can be configured as respective "plug-in" assemblies having fixed arrangements of adapters for connecting to or disconnecting from the medical and electrical outlets or the individual lines can be made with separate adapters 236, 238, 240, 242, 244, 246, and 248 as shown for connecting only those utilities that are instantly needed and for disconnecting those that are not needed. The safety cable 160 terminates with a hook 250 that can be connected to an eyelet 252 in the exterior wall 24 shown in FIG. 4.

Figure 5:
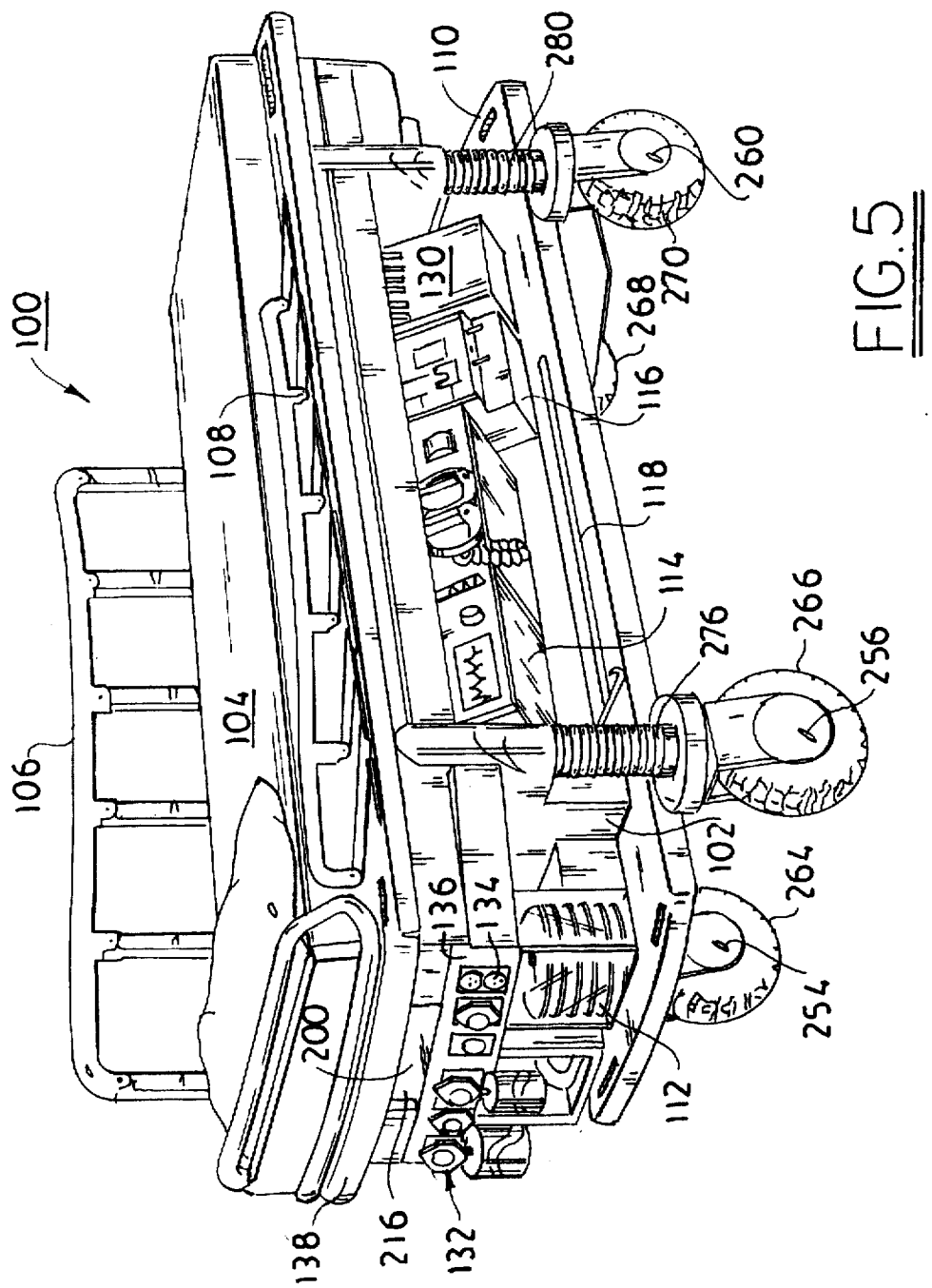
FIG. 5 is a perspective view from a front end of our new gurney, which can be used as an interior or exterior treatment platform.
Figure 6:
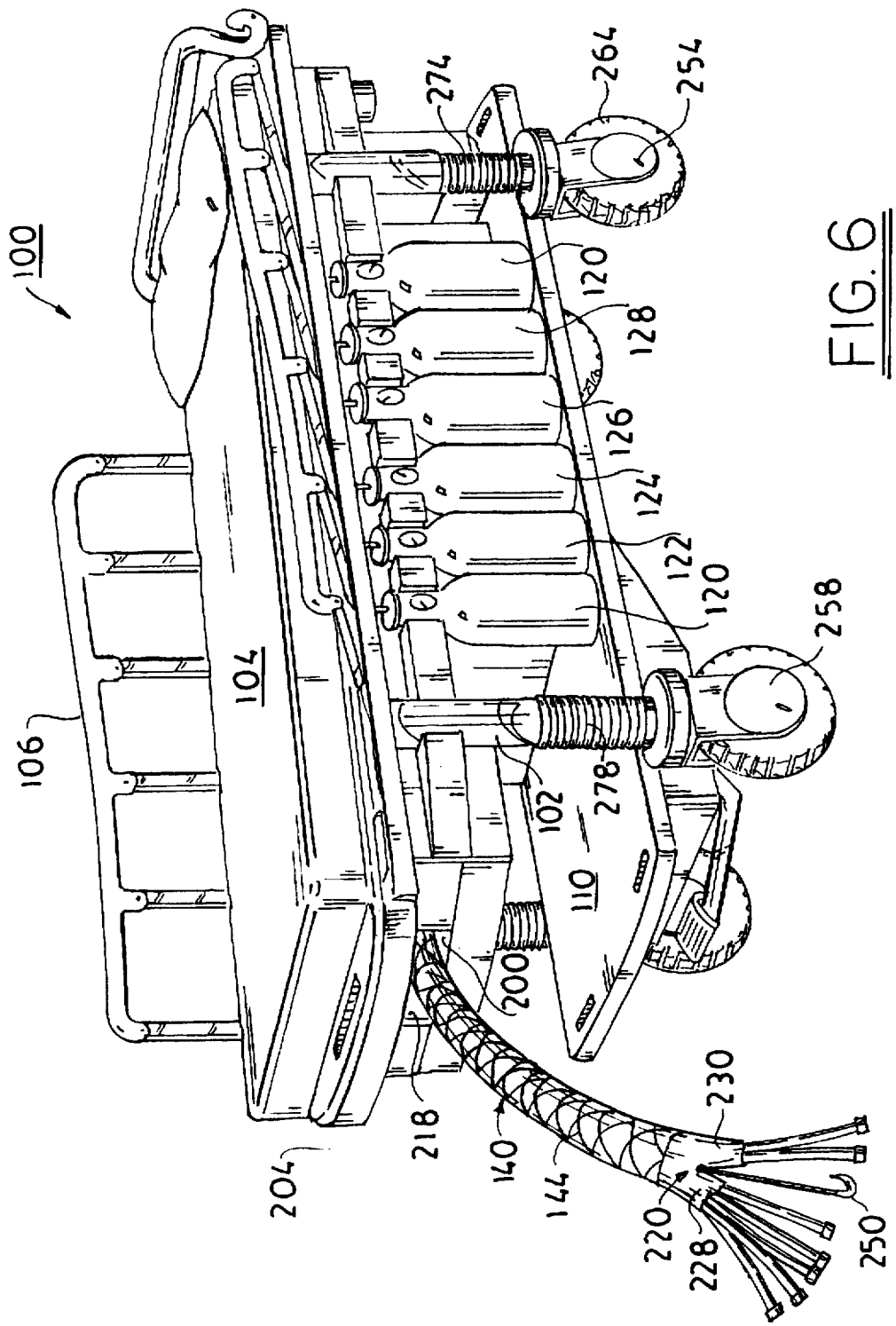
FIG. 6 is a perspective view from a rear end of the same gurney.

The gurney 100, as shown in FIGS. 5 and 6, also includes front and rear steerable wheels 254, 256, 258, and 260 cushioned by respective air tires 264, 266, 268, and 270 and shock absorbers 274, 276, 278, and 280 to help maintain smoothness and stability. Hand and foot brakes and motorization can be used for even better control.

Although the invention has been described with respect to preferred embodiments, other variations and combinations of the disclosed elements will be apparent to those of skill in the art in accordance with the disclosed teaching.

We claim:

1. An umbilicus system for conveying medical utilities comprising:
   a mobile unit containing medical utilities transportable to remote locations;
   a plurality of mobile treatment platforms for delivering medical services to a plurality of patients;
   said mobile treatment platforms being supported independent of said mobile unit and being movable independent of each other for adjusting positions of said mobile treatment platforms with respect to said mobile unit; and
   a plurality of umbilici each connecting one of said mobile treatment platforms to said mobile unit for delivering said medical utilities to said treatment platforms.

2. The system of claim 1 in which each of said umbilici includes a bundle of lines extending between said treatment platforms and said mobile unit for delivering said medical utilities to said treatment platforms.

3. The system of claim 2 in which said mobile unit includes groups of ports that are connected to said medical utilities, and said umbilici include adapters for connecting and disconnecting said bundle of lines to one of said groups of ports.

4. The system of claim 1 in which said treatment platforms contain onboard medical utilities and a series of valves for selectively dispensing medical utilities to patients from either said umbilici or said onboard medical utilities.

5. The system of claim 2 in which said bundle of lines is surrounded by a sheath.

6. The system of claim 5 in which a safety cable connecting said treatment platforms to said mobile unit is among the lines surrounded by said sheath to protect the other lines from overextension.

7. The system of claim 3 in which said mobile treatment platforms include medical action boards each providing a series of outlets for dispensing the medical utilities.

8. The system of claim 7 in which each umbilicus includes a first end connected to one of said medical action boards and a second end terminated by said adapters that can be connected and disconnected to one of said groups of ports.

9. The system of claim 8 in which said mobile treatment platforms include trays located beneath liters for supporting portions of said umbilici.

10. The system of claim 1 in which said mobile unit includes a service compartment containing the medical utilities and a treatment compartment for administering medical services.

11. The system of claim 10 further comprising an additional treatment platform that is supported within said treatment space for administering the medical services.

12. An umbilicus system for delivering interior and exterior medical services from a mobile medical unit comprising:
   a mobile medical unit having an interior space divided into a treatment compartment and a service compartment;
   said service compartment containing medical utilities;
   said treatment compartment including an interior treatment platform for administering medical services to patients;
   said interior treatment platform being supported within said treatment compartment of the mobile medical unit;
   said mobile medical unit including a series of interior ports connected to said medical utilities;
   an interior umbilicus connecting said interior ports to said interior treatment platform for delivering said medical utilities to said interior treatment platform;
   an exterior treatment platform located outside of said interior space;
   said mobile medical unit including a series of exterior ports connected to said medical utilities; and
   an exterior umbilicus connecting said exterior ports to said exterior treatment platform for delivering said medical utilities to said exterior treatment platform.

13. The umbilicus system of claim 12 in which said medical unit includes exterior walls, and said exterior ports are located in said exterior walls.

14. The umbilicus system of claim 13 in which a soft shelter projects from one of said exterior walls for covering said exterior treatment platform.

15. The umbilicus system of claim 13 in which said exterior ports include a first group of ports for delivering medical utilities and a second group of ports for delivering electrical utilities, and said exterior umbilicus is split into a first group of lines for connecting to said first group of ports and a second group of lines for connecting to said second group of ports.

16. The umbilicus system of claim 13 in which said umbilicus also includes a safety cable having an end shaped for connection to said exterior walls of the mobile medical unit for protecting said groups of lines from overextension.

17. The umbilicus system of claim 12 in which said exterior treatment platform includes a series of outlets supplied by said exterior umbilicus for dispensing the medical utilities.

18. The umbilicus system of claim 17 in which said exterior treatment platform is a gurney including onboard medical utilities for supplying said series of outlets with said onboard medical utilities and includes a series of valves for selectively supplying said series of outlets from either said exterior umbilicus or said onboard medical utilities.

19. The umbilicus system of claim 12 in which said exterior treatment platform is a gurney having a tray located beneath a litter for supporting said exterior umbilicus.

20. The umbilicus system of claim 19 in which said tray includes two openings located at opposite ends of said gurney, and a free end of said exterior umbilicus can be extended through either of said two openings.

21. The umbilicus system of claim 12 in which said interior ports are located above said interior treatment platform for providing unrestricted lateral access around said interior treatment platform.

22. The umbilicus system of claim 21 in which said interior treatment platform and said exterior treatment platform include front and rear ends, and said interior umbilicus is extended from said rear end of the interior treatment platform for connection to said interior ports and said exterior umbilicus is extended from said front end of the exterior treatment platform for connection to said exterior ports.

23. The umbilicus system of claim 12 further comprising a second exterior treatment platform and a second exterior umbilicus connecting said exterior ports to said second exterior treatment platform for delivering said medical utilities to said second exterior treatment platform.

24. An umbilicus system for conveying medical utilities comprising:

a mobile unit containing central medical utilities transportable to remote locations;

a mobile treatment platform containing onboard medical utilities;

an umbilicus connecting said mobile treatment platform to said mobile unit for delivering said central medical utilities to said treatment platform; and a series of valves for selectively dispensing medical utilities to patients from either said umbilicus or said onboard medical utilities.

25. The system of claim 24 in which said mobile treatment platform is one of a plurality of mobile treatment platforms containing onboard medical utilities, and said umbilicus is one of a plurality of umbilici connecting said mobile treatment platforms to said mobile unit for delivering said central medical utilities to said treatment platforms.

26. The system of claim 25 in which said mobile unit includes groups of ports connected to said central medical utilities, and each of said mobile treatment platforms includes a series of valves for dispensing medical utilities from either said umbilici or said onboard medical utilities.

27. The system of claim 26 in which said umbilici connect said groups of ports to said series of outlets for delivering said central medical utilities to said mobile treatment platforms.

28. The system of claim 25 in which said mobile treatment platforms are supported independent of said mobile unit and are movable independent of each other for adjusting positions of said mobile treatment platforms with respect to said mobile unit.

* * * * *